US012611804B2

(12) United States Patent
Takada

(10) Patent No.: US 12,611,804 B2
(45) Date of Patent: Apr. 28, 2026

(54) RESIN SUPPLY DEVICE, RESIN MOLDING APPARATUS, AND METHOD FOR PRODUCING RESIN MOLDED PRODUCT

(71) Applicant: TOWA CORPORATION, Kyoto (JP)

(72) Inventor: Naoki Takada, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 140 days.

(21) Appl. No.: 18/694,484

(22) PCT Filed: Jun. 22, 2022

(86) PCT No.: PCT/JP2022/024808
§ 371 (c)(1),
(2) Date: Mar. 22, 2024

(87) PCT Pub. No.: WO2023/053618
PCT Pub. Date: Apr. 6, 2023

(65) Prior Publication Data
US 2024/0326301 A1     Oct. 3, 2024

(30) Foreign Application Priority Data

Sep. 30, 2021     (JP) ................................. 2021-160569

(51) Int. Cl.
B29C 64/118     (2017.01)
B29C 43/18     (2006.01)
B29C 43/34     (2006.01)

(52) U.S. Cl.
CPC .............. B29C 43/34 (2013.01); B29C 43/18 (2013.01); *B29C 2043/181* (2013.01)

(58) Field of Classification Search
CPC ....... B29C 43/00; B29C 43/085; B29C 64/00;

B29C 64/20; B29C 64/209; B29C 64/30;
B29C 64/321; B29C 64/118; B29C 64/10;
B29C 64/171; B29C 67/00
See application file for complete search history.

(56) References Cited

U.S. PATENT DOCUMENTS

| | | | | |
|---|---|---|---|---|
| 2009/0020903 A1 | 1/2009 | Takeuchi et al. | | |
| 2013/0209600 A1* | 8/2013 | Tow | .......................... | B01L 3/02 |
| | | | | 425/375 |
| 2013/0251872 A1* | 9/2013 | Axelrod | ................ | B29C 48/875 |
| | | | | 426/516 |

FOREIGN PATENT DOCUMENTS

| | | | | |
|---|---|---|---|---|
| CN | 108506519 A | 9/2018 | | |
| CN | 211398651 U | 9/2020 | | |
| CN | 112709838 A | 4/2021 | | |
| CN | 110154300 B | * 2/2022 | ............. | B29C 43/18 |
| JP | H3-152 A | 1/1991 | | |
| JP | H11-33439 A | 2/1999 | | |

(Continued)

OTHER PUBLICATIONS

Taiwan Office Action issued Jan. 5, 2023.

*Primary Examiner* — Cedrick S Williams
(74) *Attorney, Agent, or Firm* — Dilworth & Barrese, LLP

(57)     ABSTRACT

A resin supply device includes a resin supply mechanism configured to contain and supply a resin material; a nozzle made of an elastic material and having an ejection outlet for ejecting the resin material from the resin supply mechanism; and a clamp mechanism configured to press a tip of the nozzle from outside to shape the ejection outlet into three or more fold rotational symmetry about an axis of the nozzle and change an opening area of the ejection outlet.

10 Claims, 7 Drawing Sheets

(56)         References Cited

FOREIGN PATENT DOCUMENTS

| JP | 2012-126075 | A | 7/2012 |
|----|-------------|---|--------|
| JP | 2017-193095 | A | 10/2017 |
| JP | 2018-118189 | A | 8/2018 |
| WO | 2006/077908 | A1 | 7/2006 |

* cited by examiner

Fig.5

RESIN SUPPLY DEVICE, RESIN MOLDING APPARATUS, AND METHOD FOR PRODUCING RESIN MOLDED PRODUCT

TECHNICAL FIELD

This disclosure relates to a resin supply device, a resin molding apparatus, and a method for producing a resin molded product.

BACKGROUND ART

Substrates with semiconductor chips mounted thereon, for example, are typically sealed up in resin for use as electronic parts. There have been known, as resin molding apparatuses for sealing up substrates in resin, those including a resin supply device that includes a nozzle from which to eject liquid resin onto a substrate as a supply target (see, for example, Patent Literatures 1 and 2).

Patent Literature 1 discloses an applying device for ejecting from its ejection outlet an application agent such as an adhesive or solder paste to apply the application agent to a substrate. The applying device is configured to change the diameter of the ejection outlet to change the amount of the application agent to be ejected per unit time. Specifically, the ejection outlet of its nozzle includes two or more flat plates arranged horizontally on top of one another. Changing how much the flat plates overlap with one another changes the diameter of the ejection outlet to change the amount of the application agent to be ejected per unit time. Patent Literature 1 also discloses the technique of pressing the nozzle, which is made of an elastic material, with use of rollers from opposite sides and thereby reducing the diameter of the nozzle to change the amount of the application agent to be ejected per unit time.

Patent Literature 2 discloses a substrate processing device including an ejection outlet changing member at the tip of a nozzle body to change the amount of processing liquid to be ejected per unit time. The ejection outlet changing member includes a cylindrical member through the tip of the nozzle body and a hollow ring-shaped member through a lower portion of the cylindrical member. The cylindrical member and the hollow ring-shaped member are each made of a stretchable material. When the hollow ring-shaped member has atmospheric pressure inside its hollow portion, the ejection outlet ("opening" in Patent Literature 2) has a diameter smaller than the diameter of the outlet of the nozzle body, with the result of a small amount of the processing liquid to be ejected per unit time. Air injected into the hollow portion by pressure expands the hollow ring-shaped member and increases the diameter of the ejection outlet to a size equal to that of the diameter of the nozzle body to increase the amount of the processing liquid to be ejected per unit time.

CITATION LIST

Patent Literature

Patent Literature 1

Japanese Unexamined Patent Application Publication, JP H3-000152 A

Patent Literature 2

Japanese Unexamined Patent Application Publication, JP H11-033439 A

SUMMARY

Technical Problem

The applying device disclosed in Patent Literature 1, which includes two or more flat plates arranged horizontally on top of one another, lets an application agent adhere to the flat plates. The flat plates thus need maintaining such as washing each time the application agent is replaced with another kind. The substrate processing device disclosed in Patent Literature 2 lets processing liquid adhere to the hollow ring-shaped member. The hollow ring-shaped member thus need maintaining such as washing each time the processing liquid is replaced with another kind.

The above circumstances have led to a demand for a resin supply device, a resin molding apparatus, and a method for producing a resin molded product each of which facilitates maintenance and is capable of changing the amount of resin material to be ejected per unit time.

Solution to Problem

A resin supply device according to this disclosure characteristically includes: a resin supply mechanism configured to contain and supply a resin material; a nozzle made of an elastic material and having an ejection outlet for ejecting the resin material from the resin supply mechanism; and a clamp mechanism configured to press a tip of the nozzle from outside to shape the ejection outlet into three or more fold rotational symmetry about an axis of the nozzle and change an opening area of the ejection outlet.

A resin molding apparatus according to this disclosure characteristically includes: the above resin supply device; a mold die including an upper die and a lower die facing each other; and a mold clamp mechanism configured to clamp the mold die with the resin material between the upper die and the lower die, the resin material having been supplied from the resin supply device.

A method according to this disclosure for producing a resin molded product is characteristically a method for producing a resin molded product with use of the above resin molding apparatus, the method including: the resin supply device supplying the resin material to a supply target with the tip of the nozzle pressed by the clamp mechanism; and producing a resin molded product with use of the resin material supplied by the resin supply device.

Advantageous Effects

This disclosure provides a resin supply device, a resin molding apparatus, and a method for producing a resin molded product each of which facilitates maintenance and is capable of changing the amount of resin material to be ejected per unit time.

BRIEF DESCRIPTION OF DRAWINGS

FIG. 5 is a perspective view of a clamp unit.

DESCRIPTION OF EMBODIMENTS

Figure 1:
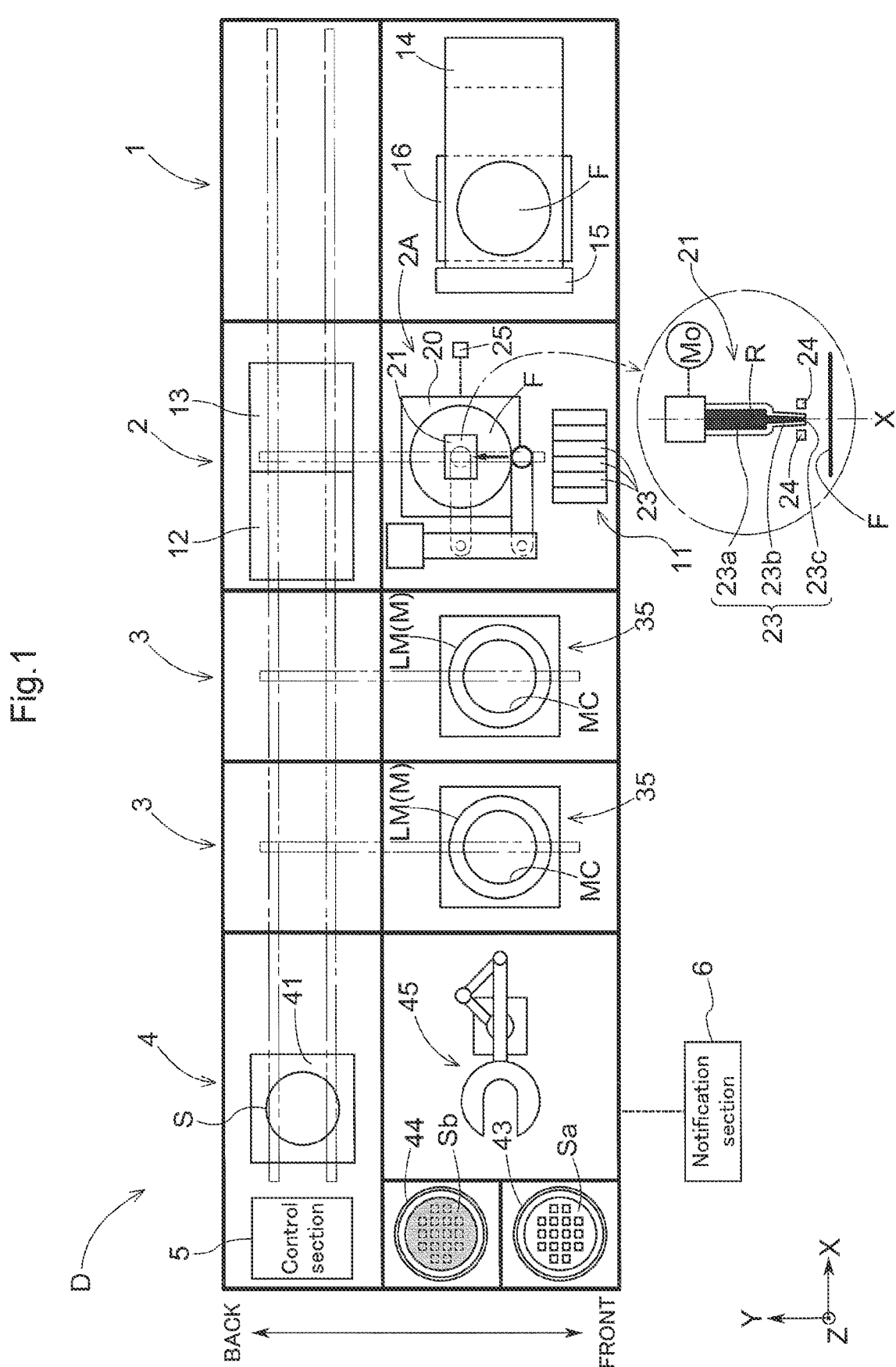
FIG. 1 is a diagram schematically illustrating a resin molding apparatus as an embodiment.

The description below deals with a resin supply device, a resin molding apparatus, and a method for producing a resin molded product as embodiments of this disclosure with reference to drawings. The embodiments described involve, as an example resin molding apparatus, a resin molding apparatus D including a resin supply module 2 as illustrated in FIG. 1. This disclosure is, however, not limited to the embodiments below, and may be altered variously as long as such alteration falls within the scope of this disclosure.
[Apparatus Configuration]

Substrates with semiconductor chips (which is an example electronic element) mounted thereon, for example, are sealed up in resin for use as electronic parts. An object to be molded is sealed up in resin by, for example, a compression method (compression molding) or transfer method. An example of the compression method is a resin sealing method that includes supplying liquid resin onto a release film, placing the release film onto a lower die of a mold die, and immersing an object to be molded into the liquid resin on the release film for resin molding. The resin molding apparatus D as the present embodiment uses the compression method. The resin supply module 2 is configured to supply liquid resin onto, for example, a mold die M, a substrate (which is an example of the "supply target"), or a release film (which is an example of the "supply target") F. The description below is based on the premise that the supply target, onto which the resin supply module 2 supplies liquid resin (which is an example of the "resin material") R, is a release film F and that the object to be molded is, as an example, a substrate S with semiconductor chips (hereinafter referred to also as "chips") mounted thereon. Further, the gravitational direction corresponds to the downward direction, whereas the direction opposite to the gravitational direction corresponds to the upward direction. FIG. 1 shows a Z direction as an up-down direction. The description below will deal with a release-film cutting module 1, a resin supply module 2, compression-molding modules 3, and a conveying module 4 arranged in an X direction. The direction perpendicular to the X and Z directions (that is, the depth direction of each module) is a Y direction. Example electronic elements include resistor elements and capacitor elements other than semiconductor chips.

FIG. 1 is a diagram schematically illustrating the resin molding apparatus D. The resin molding apparatus D as the present embodiment includes a release-film cutting module 1, a resin supply module 2, a plurality of (two for the present embodiment) compression-molding modules 3, a conveying module 4, a control section 5, and a notification section 6. The release-film cutting module 1, the resin supply module 2, the plurality of compression-molding modules 3, and the conveying module 4 are independently attachable to and detachable from one another. The present embodiment includes two compression-molding modules 3, but may alternatively include one compression-molding module 3 or three or more compression-molding modules 3.

The release-film cutting module 1 is configured to cut off, from a long film, a portion with a circular shape in a plan view as a release film F. The release-film cutting module 1 includes a film roll 14, a film gripper 15, and a film placement mechanism 16. The film gripper 15 holds an end of a film from the film roll 14 and unwinds the film roll 14. The film placement mechanism 16 cuts off a release film F with a circular shape in a plan view from the film roll 14 with use of a cutter (not illustrated in the drawings).

The resin supply module 2 includes a resin supply device 2A configured to supply liquid resin R for resin molding onto a resin supply area of the release film F. The term "liquid resin R" as used herein refers to resin that is in the liquid state at normal temperature (room temperature). Liquid resin R may be a thermoplastic resin or a thermosetting resin. A thermosetting resin, which is in the liquid state at normal temperature, has a viscosity that becomes decreased when the thermosetting resin is heated. Continuing to heat a thermosetting resin polymerizes and cures the thermosetting resin into a cured resin. The liquid resin R for the present embodiment is preferably a thermosetting resin having a relatively high viscosity that does not allow the thermosetting resin to flow easily at normal temperature.

The resin supply device 2A includes a table 20 on which to place the release film F received from the release-film cutting module 1, a dispenser unit 21 configured to supply liquid resin R onto the release film F, and a weight sensor 25. The release film F received from the release-film cutting module 1 is held on the upper surface of the table 20 as the release film F is pulled by a suction mechanism (not illustrated in the drawings).

The dispenser unit 21 includes a cartridge 23 with a nozzle 23b and a clamp mechanism 24 configured to clamp the tip of the nozzle 23b. The cartridge 23 includes a plunger (not illustrated in the drawings) for pushing liquid resin R out of a syringe (which is an example of the "resin supply mechanism") 23a (described later). The dispenser unit 21 moves the plunger downward to supply a predetermined amount of liquid resin R out of the cartridge 23 onto the release film F. The dispenser unit 21 is movable on an XY plane (horizontally) parallel to the surface on which the release film F is placed. The dispenser unit 21 is also movable in the Z direction (up-down direction). The nozzle 23b of the cartridge 23 is made of an elastic material such as silicone rubber. The clamp mechanism 24 is configured to squeeze the tip of the nozzle 23b to change the opening area of the ejection outlet 23c of the nozzle 23b. The clamp mechanism 24 is detailed later. In addition to or in place of the dispenser unit 21, the table 20 may be movable on an XY plane. The dispenser unit 21 may be driven by any driving source. The driving source may be, for example, an electric motor Mo such as a servomotor, but is not limited thereto.

The cartridge 23 includes a syringe 23a containing liquid resin R and a nozzle 23b attached to the tip of the syringe 23a for ejecting the liquid resin R. The syringe 23a and the nozzle 23b are both substantially cylindrical in shape. While the nozzle 23b has an axis X extending through its center, the syringe 23a has an axis extending through its center which axis coincides with the axis X. The resin supply module 2 includes a resin storage 11 capable of storing a plurality of (six for the present embodiment) cartridges 23 in advance. The dispenser unit 21 is configured to, when it has used up all liquid resin R contained in a cartridge 23, automatically replace the cartridge 23 with a new cartridge 23.

The weight sensor 25 is configured to measure the weight of liquid resin R supplied on the release film F. The weight sensor 25 is a publicly known load sensor. The weight sensor 25 measures the weight of supplied or collected liquid resin R on the basis of the difference between the weight of the release film F on which resin has been supplied and the weight of the release film F on which resin has not been supplied.

The resin molding apparatus D includes a resin loader 12 and rails for the resin loader 12. The resin loader 12 is movable on the rails in the X direction between the release-film cutting module 1, the resin supply module 2, and the two compression-molding modules 3. The resin loader 12 is also movable on a rail in the Y direction inside the resin supply module 2 and each of the two compression-molding modules 3. The resin loader 12 is capable of conveying a release film F cut off by the release-film cutting module 1 to the resin supply module 2, and is also capable of holding the release film F on which liquid resin R has been supplied by the resin supply device 2A and conveying the release film F to the compression-molding modules 3. The resin molding apparatus D includes a clearing mechanism 13 configured to move together with the resin loader 12. The clearing mechanism 13 is capable of removing a used release film F from each compression-molding module 3 and discarding the used release film F at a discard section (not illustrated in the drawings) of the release-film cutting module 1.

The compression-molding modules 3 each include at least a mold die M and a mold clamp mechanism 35 configured to clamp the mold die M. The compression-molding modules 3 are detailed later.

The conveying module 4 is configured to convey (i) a resin-sealing target substrate Sa (molding target substrate) that is provided with chips mounted thereon and that has not been sealed up in resin and (ii) a resin-sealed substrate Sb (resin molded product) that has been sealed up in resin. The conveying module 4 includes a substrate loader 41, a first container section 43 configured to store resin-sealing target substrates Sa, a second container section 44 configured to store resin-sealed substrates Sb, and a robot arm 45. The robot arm 45 is disposed inside the conveying module 4, and is capable of giving a resin-sealing target substrate Sa to the substrate loader 41 and receiving from the substrate loader 41 a resin-sealed substrate Sb that has been conveyed to the conveying module 4. The substrate loader 41 is movable in the X and Y directions inside the conveying module 4 and each of the compression-molding modules 3.

The conveying module 4 further includes a check mechanism (not illustrated in the drawings). The check mechanism is configured to check in which area chips are disposed on the substrate S (resin-sealing target substrate Sa) as an object to be molded at the compression-molding modules 3. The check mechanism causes a laser displacement gauge to scan the surface of the substrate S to check whether chips are actually disposed in that area for chips which the check mechanism is intended to check, and thereby stores information on the area in which chips are disposed and the area in which no chips are disposed. The check mechanism may alternatively cause, for example, a visible-light camera to capture an image of the surface of the substrate S and check on the basis of the captured image whether chips are disposed in an intended area on the substrate S.

The control section 5 includes programs as software for controlling how the resin molding apparatus D is operated. The programs are stored on hardware such as a hard disc drive (HDD) or a memory, and are executed by a processor of a computer such as a central processing unit (CPU). The control section 5 for the present embodiment is configured to control the resin supply device 2A of the resin supply module 2 for ejecting liquid resin R onto a release film F in an amount (weight) with increased accuracy. The notification section 6 includes, for example, a display and/or a warning lamp disposed in front of the conveying module 4 and configured to notify the operator about how the resin molding apparatus D is operated.

[Configuration of Mold Die]

Figure 2:
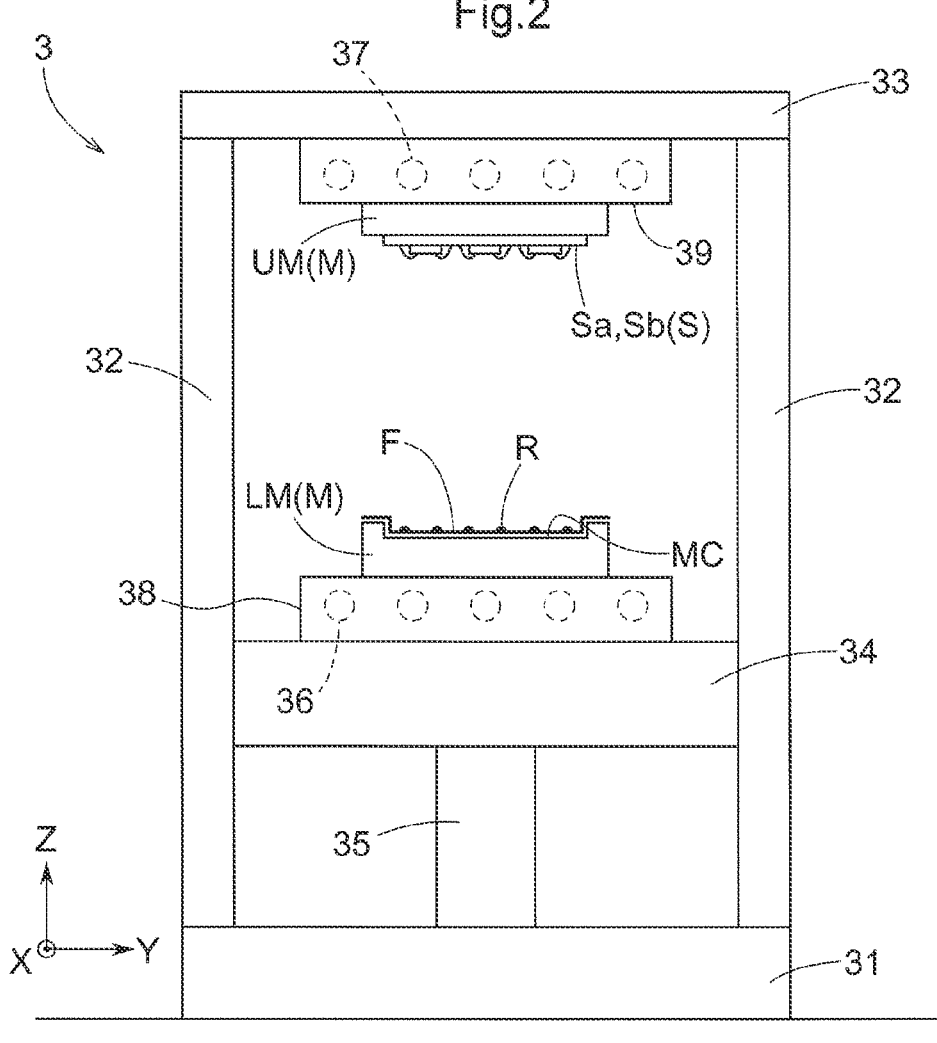
FIG. 2 is a diagram schematically illustrating a mold clamp mechanism of a resin molding apparatus.

As illustrated in FIG. 2, each compression-molding module 3 for the present embodiment includes a pressed frame including a lower fixed plate 31, an upper fixed plate 33, and plate-shaped members 32 by which the lower fixed plate 31 and the upper fixed plate 33 are integrated with each other. The compression-molding module 3 includes a movable platen 34 between the lower fixed plate 31 and the upper fixed plate 33. The movable platen 34 is movable in the up-down direction along the plate-shaped members 32. The compression-molding module 3 includes, over the lower fixed plate 31, a mold clamp mechanism 35 (such as a ball screw) configured to move the movable platen 34 upward and downward. The mold clamp mechanism 35 is capable of moving the movable platen 34 upward to clamp the mold die M and downward to open the mold die M. The mold clamp mechanism 35 may be driven by any driving source. The driving source may be, for example, an electric motor such as a servomotor (not illustrated in the drawings).

The mold die M includes an upper die UM and a lower die LM made of, for example, metal and facing each other. The compression-molding module 3 includes, on the lower surface of the upper fixed plate 33, an upper-mold holder 39 including an upper heater 37. The upper-mold holder 39 has a lower surface to which the upper die UM is attached. The upper die UM includes, on its lower surface, an upper-die substrate attachment section (not illustrated in the drawings) to which a substrate S is attachable that is provided with, for example, chips mounted thereon. The compression-molding module 3 includes, on the upper surface of the movable platen 34, a lower-mold holder 38 including a lower heater 36. The lower-mold holder 38 has an upper surface on which the lower die LM is provided. The lower die LM has a lower-mold cavity MC, into which a release film F is sucked by a suction mechanism (not illustrated in the drawings) and in which the release film F is then held. This allows liquid resin R applied onto the release film F by the resin supply device 2A to be provided in the lower-mold cavity MC. The compression-molding module 3 causes the mold clamp mechanism 35 to clamp the mold die M and also causes the lower heater 36 to heat the lower die LM so that the liquid resin R in the lower-mold cavity MC is melted and cured. The compression-molding module 3, in other words, causes the mold clamp mechanism 35 to clamp the mold die M for resin sealing while a resin-sealing target substrate Sa and a release film F each as a supply target are placed between the upper die UM and the lower die LM. This allows the resin-sealing target substrate Sa to be sealed up in resin. The above operation allows, for example, chips mounted on a resin-sealing target substrate Sa (molding target substrate) to be sealed up in resin in the lower-die cavity MC, thereby producing a resin-sealed substrate Sb (resin molded product).

First Embodiment

Figures 3, 4:
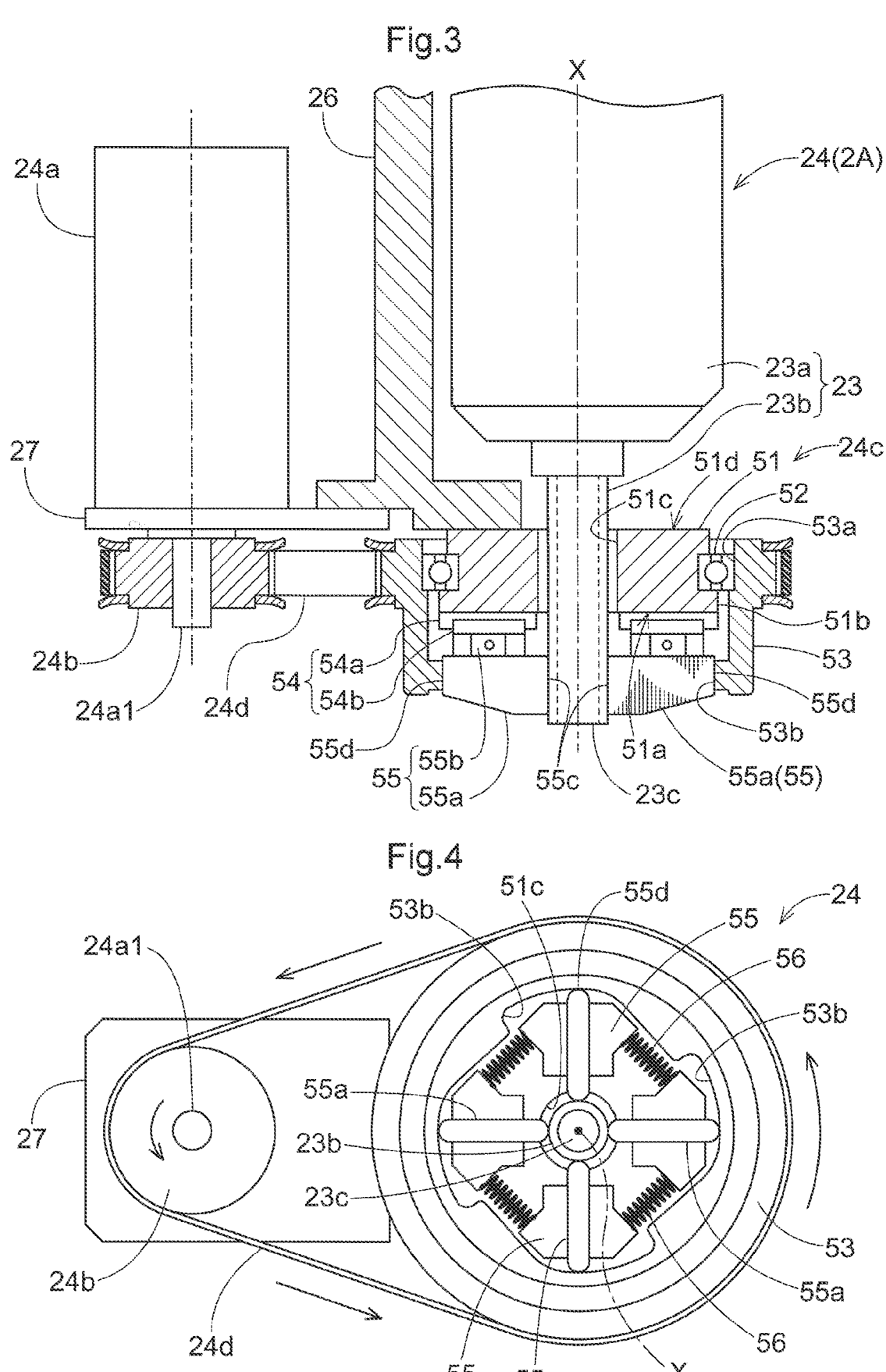
FIG. 3 is a cross-sectional side view of a clamp mechanism for a first embodiment.
FIG. 4 is a bottom view of a clamp mechanism.
Figure 5:
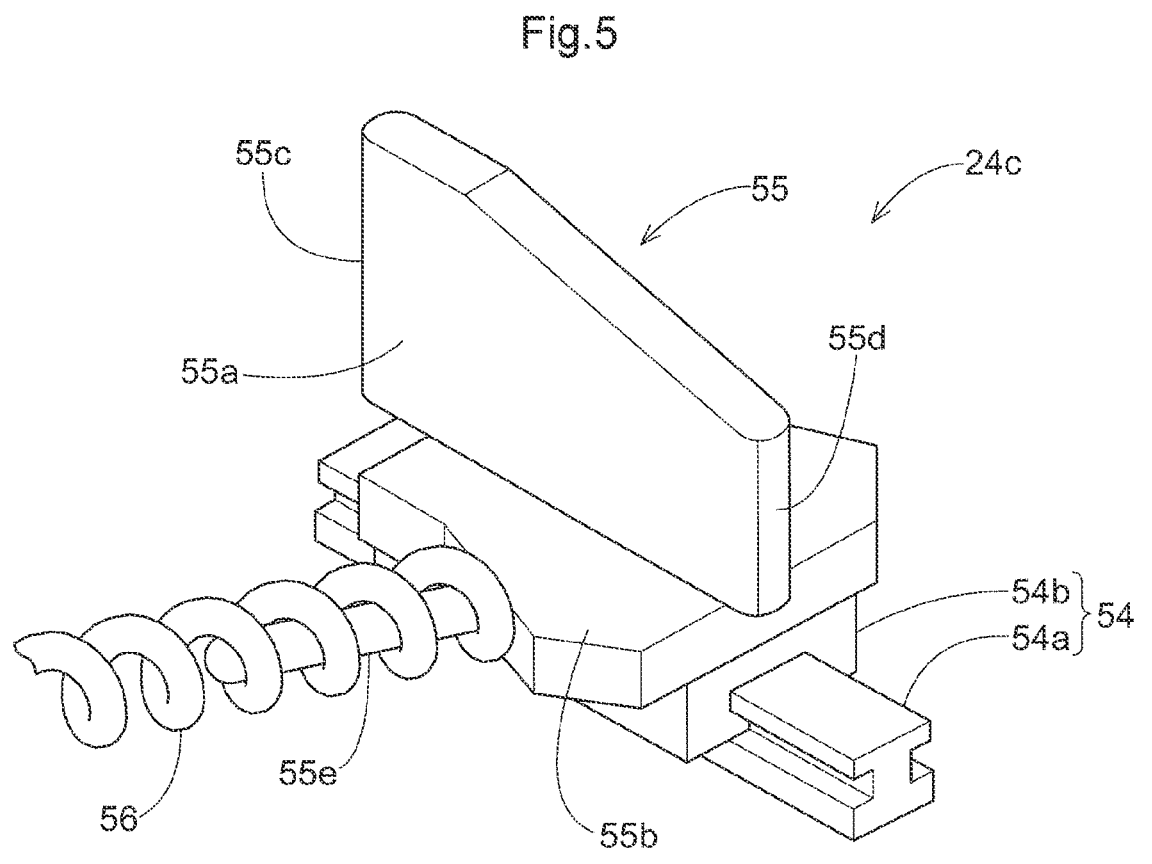

The description below deals with a clamp mechanism 24 for the first embodiment. FIGS. 3 to 5 each schematically illustrate a clamp mechanism 24. The clamp mechanism 24 for the present embodiment includes an electric motor 24a, a pulley 24b, a clamp unit 24c, and a timing belt 24d.

The electric motor 24a is capable of controlling its rotation angle in both the normal and reverse directions such as a stepping motor or a servomotor. While the cartridge 23 is held by an attachment member 26, the electric motor 24*a* is attached to the attachment member 26 with use of a holder plate 27. The electric motor 24*a* includes a rotary shaft 24*al* to which the pulley 24*b* is attached, so that the pulley 24*b* is rotatable integrally with the rotary shaft 24*al*.

The clamp unit 24*c* includes a ring-shaped fixing section 51, bearings (which is an example of the "bearing member") 52, a ring-shaped cam 53, linear motion guides 54, clamp members 55, and compression coil springs (which is an example of the "elastic member") 56.

The ring-shaped fixing section 51 is a substantial cylinder made of a metal such as iron or aluminum or of a resin. The ring-shaped fixing section 51 has a lower face 51*a* and an upper face 51*d* both substantially circular in shape and parallel to each other. The ring-shaped fixing section 51 has a side face 51*b* between the lower and upper faces 51*a* and 51*d*. The ring-shaped fixing section 51 also has a hole 51*c* extending from a central portion of the lower face 51*a* to a central portion of the upper face 51*d*. The ring-shaped fixing section 51 is attached to the attachment member 26 in such a manner as to have a center through which the axis X extends and surround the nozzle 23*b* of the cartridge 23. In other words, the nozzle 23*b* extends through the hole 51*c* in the ring-shaped fixing section 51. The lower and upper faces 51*a* and 51*d* are perpendicular to the axis X. The lower face 51*a* is toward the ejection outlet 23*c* of the nozzle 23*b*, whereas the upper face 51*d* is toward the syringe 23*a*. The lower and upper faces 51*a* and 51*d* are not necessarily parallel to each other or perpendicular to the axis X, as long as the clamp unit 24*c* serves its functions described later.

The side face 51*b*, which the ring-shaped fixing section 51 has on its side, is surrounded by the ring-shaped cam 53 with bearings 52 in-between. In other words, the bearings 52 are between the ring-shaped fixing section 51 and the ring-shaped cam 53. The ring-shaped cam 53 is made of a metal such as iron or aluminum or of a resin. The ring-shaped cam 53 has a ring-shaped attachment face 53*a* in contact with the outer ring of each bearing 52 and a ring-shaped cam face 53*b* downward of the attachment face 53*a* in the Z direction (that is, further in the gravitational direction than the attachment face 53*a*) and inward of the attachment face 53*a*. The bearings 52 each include an inner ring in contact with the side face 51*b*. The ring-shaped cam 53 is thereby held by the ring-shaped fixing section 51 in such a manner as to be rotatable relative to the ring-shaped fixing section 51. The inner and outer rings of each bearing 52 are press-fitted, bonded, or otherwise fixed to the side face 51*b* and the attachment face 53*a*, respectively.

The linear motion guides 54 are on the lower face 51*a* of the ring-shaped fixing section 51, which lower face 51*a* is toward the ejection outlet 23*c* of the nozzle 23*b*. The linear motion guides 54 each include a linear rail 54*a* fixed to the lower face 51*a* and a block 54*b* movable on the rail 54*a* relative to the rail 54*a* while being guided by the rail 54*a*. The rail 54*a* and the block 54*b* are each made of a metal such as iron or aluminum or of a resin. The present embodiment includes four linear motion guides 54 extending radially outward from the center of the ring-shaped fixing section 51 (through which center the axis X extends) and circumferentially apart from one another by 90 degrees.

The clamp members 55 are on the respective blocks 54*b* of the four linear motion guides 54. Specifically, the present embodiment includes four clamp members 55 each made of a metal such as iron or aluminum or of a resin and circumferentially apart from one another by 90 degrees similarly to the blocks 54*b*. The clamp members 55 each include a plate-shaped flange portion 55*b* screwed or otherwise fixed in a publicly known manner to the corresponding one of the blocks 54*b* and a plate-shaped clamp portion 55*a* perpendicular to a surface of the flange portion 55*b*. The clamp portion 55*a* is on the flange portion 55*b* in such a manner as to have opposite faces parallel to the corresponding linear motion guide 54. The clamp portion 55*a* has an inner end 55*c* and an outer end 55*d* both radially outside the flange portion 55*b* as viewed along the axis X. The inner and outer ends 55*c* and 55*d* each have a smoothly curved surface (specifically, semicircular as viewed along the axis X) continuous with the opposite faces. The clamp members 55 are each movable linearly, radially relative to the ring-shaped fixing section 51, and integrally with the block 54*b* of the corresponding linear motion guide 54 while being guided on its rail 54*a*.

The four clamp members 55 are each inward of the ring-shaped cam 53 with its outer end 55*d* in contact with the cam face 53*b* of the ring-shaped cam 53. The clamp members 55 each have an inner end 55*c* slightly upward in the Z direction of the ejection outlet 23*c* of the nozzle 23*b* of the cartridge 23. With each clamp member 55 positioned farthest outward in the radial direction (hereinafter referred to also as "initial state"), the inner end 55*c* is apart from the outer surface of the nozzle 23*b* by no or minutely small distance.

The flange portion 55*b* of each of the four clamp members 55 is provided with a pair of columnar protrusions 55*e* on the left and right relative to the radial direction and inclined by 45 degrees. The compression coil springs 56 are each disposed between circumferentially adjacent flange portions 55*b*, and each extend between mutually adjacent ones of the respective pairs of protrusions 55*e* in a bridging manner. The present embodiment thus includes four compression coil springs 56. The compression coil springs 56 each extending between adjacent clamp members 55 in a bridging manner constantly press each clamp member 55 away from the other clamp members 55. Since the clamp members 55 are each movable only radially along the corresponding rail 54*a*, the compression coil springs 56 constantly apply to the four clamp members 55 a force that causes the clamp members 55 to move radially outward. The force causes the outer end 55*d* of each clamp portion 55*a* to be in constant contact with the cam face 53*b* and apply a radially outward force to the cam face 53*b*. The clamp portion 55*a*, flange portion 55*b*, protrusions 55*e* of each clamp member 55 and the block 54*b* of each linear motion guide 54 may be screwed, bonded, or otherwise fixed to one another for integration with one another. Further, two or more of these portions may be produced as a single member.

The timing belt 24*d* is wound around the pulley 24*b*, which is attached to the rotary shaft 24*al* of the electric motor 24*a*, and the ring-shaped cam 53 of the clamp unit 24*c*. This allows rotation of the rotary shaft 24*al* to be transmitted through the pulley 24*b* and the timing belt 24*d* to the ring-shaped cam 53. The pulley 24*b* has an outer diameter smaller than that of the ring-shaped cam 53. This causes the rotation to be decelerated during the transmission.

The description below deals with how the clamp mechanism 24 operates. The electric motor 24*a* rotates its rotary shaft 24*al* in the normal direction (indicated with arrows in FIG. 4), and transmits the rotation through the pulley 24*b* to the ring-shaped cam 53, thereby rotating the ring-shaped cam 53 in the normal direction. The present embodiment includes four clamp members 55 inward of the ring-shaped cam 53, which has a ring-shaped cam face 53*b* for applying a force simultaneously to the four clamp members 55 with an equal strength. The cam face 53*b* thus has four-fold rotational symmetry as viewed along the axis X. Rotational symmetry is defined later. The cam face 53*b* is shaped to, in response to the ring-shaped cam 53 rotating in the normal direction, apply a radially inward force simultaneously to the respective outer ends 55*d* of the respective clamp portions 55*a* of the four clamp members 55 against the force of the compression coil springs 56. Specifically, each section of the cam face 53*b* for applying a force to one of the clamp members 55 (that is, each section across a central angle of 90 degrees relative to the axis X) has a surface so curved as to, in response to the ring-shaped cam 53 rotating in the normal direction, become gradually (that is, continuously) closer to the axis X at a portion in contact with the outer end 55*d* of the corresponding clamp portion 55*a*.

Figure 6:
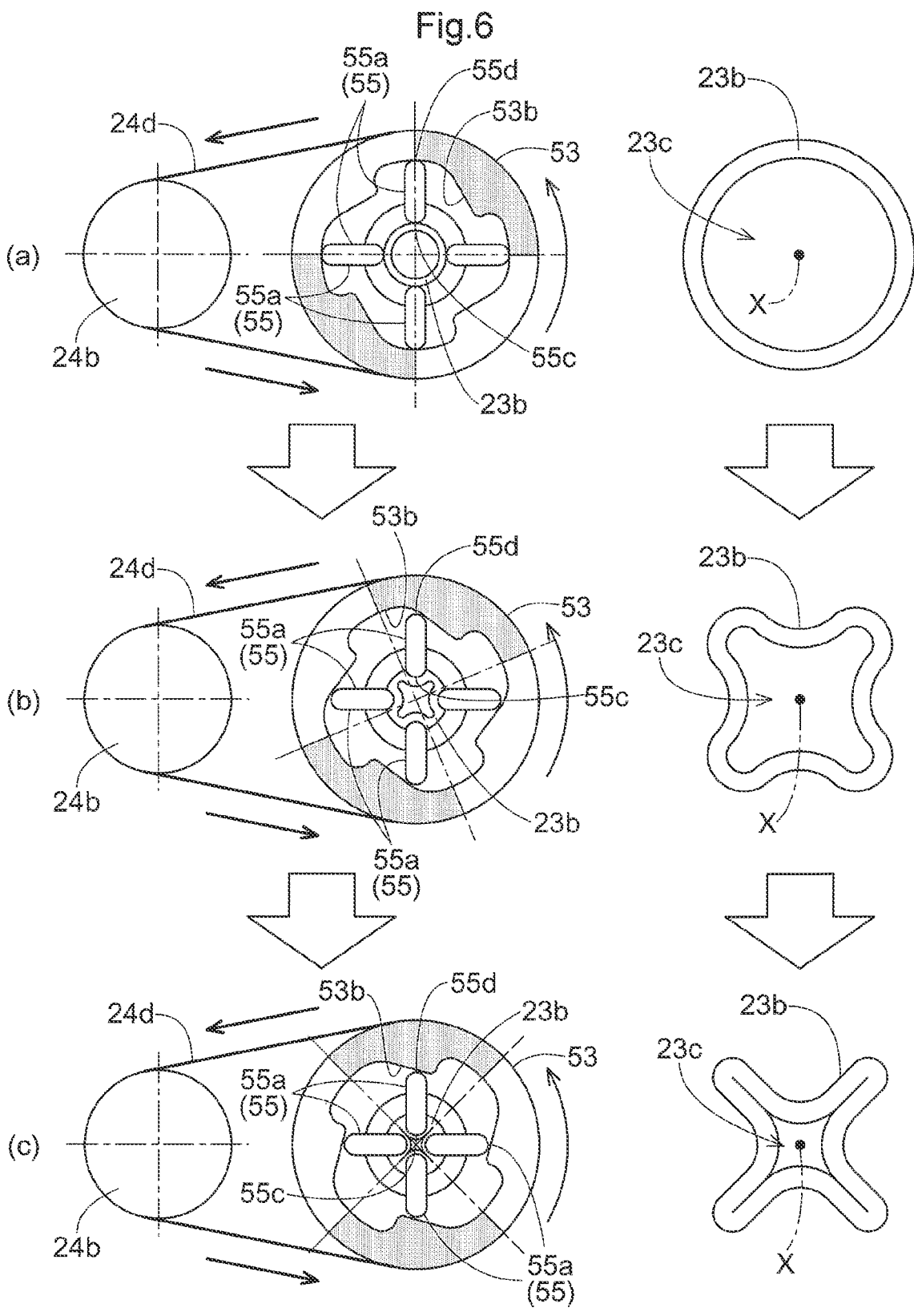
FIG. 6 shows diagrams illustrating how a clamp mechanism operates.

FIG. 6 illustrates how the clamp members 55 squeeze the nozzle 23*b* of the cartridge 23 to change the shape and opening area of the ejection outlet 23*c* in response to the ring-shaped cam 53 rotating in the normal direction. The drawing schematically illustrates on the left side the bottom surface of the clamp mechanism 24 in different instances. The drawing illustrates on the right side the ejection outlet 23*c* of the nozzle 23*b* as enlarged in the same instances. For ease of understanding, FIG. 6 illustrates only the clamp portions 55*a* among the components of the clamp members 55, colors the ring-shaped cam 53 to indicate each 90-degree section of the cam face 53*b*, and omits the compression coil springs 56.

FIG. 6 illustrates in (a) the initial state, which is prior to normal rotation of the ring-shaped cam 53. FIG. 6 illustrates in (a) the four clamp members 55 as moved farthest outward in the radial direction due to the action of the compression coil springs 56, and the respective outer ends 55*d* of the clamp portions 55*a* as pressing the cam face 53*b* radially outward, so that the cam face 53*b* is farthest apart from the axis X. In this instance, the respective inner ends 55*c* of the clamp portions 55*a* are either in contact with the outer surface of the nozzle 23*b* or proximate thereto with only a minutely small distance in-between, so that the ejection outlet 23*c* remains circular in shape and unchanged and that its opening area also remains as original.

Then, in response to the ring-shaped cam 53 rotating in the normal direction by approximately 22.5 degrees as illustrated in (b) of FIG. 6, the cam face 53*b* also rotates to become closer to the axis X than in the initial state at each portion in contact with the outer end 55*d* of a clamp portion 55*a*. The cam face 53*b* thereby presses the respective outer ends 55*d* of the four clamp members 55, which are attached to the respective blocks 54*b* of the linear motion guides 54. This moves the clamp members 55 radially inward, that is, toward the axis X of the nozzle 23*b*. The respective inner ends 55*c* of the clamp portions 55*a* thereby squeeze the tip of the nozzle 23*b*. The clamp portions 55*a* press the outer surface of the nozzle 23*b* at four positions and depress the nozzle 23*b* inward (that is, toward the axis X) to deform the ejection outlet 23*c* into an X shape and reduce its opening area. The tip of the nozzle 23*b* refers to a portion extending from the ejection outlet 23*c* to a position that comes into contact with the upper end (that is, the end on the side of the syringe 23*a*) of the inner end 55*c* of each clamp portion 55*a*.

Then, in response to the ring-shaped cam 53 rotating further in the normal direction by approximately 22.5 degrees (that is, by approximately 45 degrees in total from the initial state) as illustrated in (c) of FIG. 6, the cam face 53*b* also rotates further to become even closer to the axis X than in the state illustrated in (b) of FIG. 6. The respective inner ends 55*c* of the clamp portions 55*a* thereby further squeeze the tip of the nozzle 23*b*. The clamp portions 55*a* depress the outer surface of the nozzle 23*b* inward (that is, toward the axis X) at four positions to further reduce the opening area of the ejection outlet 23*c*. The clamp mechanism 24 operates as above under control of the control section 5.

The clamp portions 55*a* are positioned relative to the nozzle 23*b* in the vertical direction (that is, the Z direction) such that the respective inner ends 55*c* each have a lower end flush with or above the lower end of the nozzle 23*b* (that is, the ejection outlet 23*c*) in all instances illustrated in (a) to (c) of FIG. 6. The clamp portions 55*a* and the nozzle 23*b* positioned relative to each other as such prevent liquid resin R from the ejection outlet 23*c* from adhering to the clamp portions 55*a*.

FIG. 6 illustrates in (b) and (c) the ejection outlet 23*c* as having an X-shaped opening with four-fold rotational symmetry. The expression "n-fold rotational symmetry" refers to a shape that looks as original after a (360/n)-degree rotation about a point. The ejection outlet 23*c* for the present embodiment has a shape that returns to (that is, looks the same as) the original X shape after a rotation by 90 (=360/4) degrees about the axis X. The ejection outlet 23*c* thus has four-fold rotational symmetry.

Producing resin-sealed substrates Sb accurately at a compression-molding module 3 requires the resin supply device 2A to supply (that is, eject) liquid resin R onto a release film F accurately with a predetermined weight. Typically, using a nozzle 23*b* with an ejection outlet 23*c* that has a large opening area means a large amount of liquid resin R to be ejected per unit time. This leads to high productivity, but also to low accuracy in controlling the amount of liquid resin R to be ejected. Using a nozzle 23*b* with an ejection outlet 23*c* that has a small opening area means a small amount of liquid resin R to be ejected per unit time. This leads to low productivity, but to high accuracy in controlling the amount of liquid resin R to be ejected. Changing the opening area of the ejection outlet 23*c* of a nozzle 23*b* has conventionally required replacing the nozzle 23*b* with another one. This has made it impossible to increase both the productivity in producing resin-sealed substrates Sb and the accuracy in ejecting liquid resin R. The resin supply device 2A for the present embodiment is, in contrast, capable of changing the opening area of the ejection outlet 23*c* of a nozzle 23*b* with use of the clamp mechanism 24. This makes it possible to increase both the productivity in producing resin-sealed substrates Sb and the accuracy in ejecting liquid resin R without the need to replace nozzles 23*b*.

[Method for Producing a Resin Molded Product]

The description below deals with a method for producing a resin molded product with reference to FIGS. 1 and 2.

First, the robot arm 45 takes a resin-sealing target substrate Sa from the first container section 43 and places it onto the substrate loader 41 (see FIG. 1). The check mechanism then checks in which area chips and/or the like are disposed on the substrate S (resin-sealing target substrate Sa) as an object to be molded. The control section 5 calculates (or sets) an intended amount of supply of liquid resin R and an intended position of supply of liquid resin R (resin supply path) in the resin supply area of a release film F on the basis of at least, for example, the size of the substrate S as an object to be molded and/or the area in which chips and/or the like are disposed. The resin supply module 2 receives the release film F from the release-film cutting module 1, and causes the release film F to be held on the upper surface of the table 20 as the release film F is pulled by the suction mechanism. The resin supply device 2A thus receives a release film F as a supply target. Next, on the basis of the intended supply amount and intended supply position calculated as above, the control section 5 moves the dispenser unit 21 (to which a cartridge 23 is attached) of the resin supply device 2A while causing liquid resin R to be supplied from the nozzle 23b onto the release film F (resin supply step).

During the resin supply step, the control section 5 controls the clamp mechanism 24 so that the ejection outlet 23c of the nozzle 23b has its largest opening area until the weight of liquid resin R that the weight sensor 25 detects reaches a predetermined proportion (for example, 90%) of a predetermined weight (that is, an intended supply amount) (see (a) in FIG. 6). In response to the weight of liquid resin R that the weight sensor 25 detects exceeding the predetermined proportion of the predetermined weight, the control section 5 controls the clamp mechanism 24 so that the electric motor 24a rotates to rotate the ring-shaped cam 53 in the normal direction. This gradually reduces the opening area of the ejection outlet 23c as illustrated in (b) and (c) in FIG. 6 to gradually reduce the amount of liquid resin R ejected from the ejection outlet 23c per unit time. The control section 5 may, during this operation, slow the movement of the plunger (not illustrated in the drawings), which is configured to push liquid resin R out of the syringe 23a, in synchronization with the reduction of the opening area to keep the flow rate of liquid resin R to be ejected from the ejection outlet 23c. The control section 5 controls the clamp mechanism 24 and the plunger on the basis of the viscosity of the liquid resin R to stop the ejection of liquid resin R at the predetermined weight (that is, to prevent excess liquid resin R from dropping).

Next, the control section 5 causes the electric motor 24a to rotate in the reverse direction to rotate the ring-shaped cam 53 in the reverse direction. This moves the cam face 53b apart from the axis X at each portion in contact with the outer end 55d of a clamp portion 55a. The compression coil springs 56, each extending between adjacent clamp members 55 in a bridging manner as described above, expand to apply a force to the four clamp members 55 to move the clamp members 55 radially outward as the cam face 53b moves away from the axis X. This stops the clamp members 55 from applying a force to the tip of the nozzle 23b, with the result of the nozzle 23b, which is made of an elastic material such as silicone rubber, being no longer depressed and the opening area of the ejection outlet 23c returning to the initial state illustrated in (a) in FIG. 6.

Next, the control section 5 causes the substrate loader 41 to attach the resin-sealing target substrate Sa to the upper die UM. The control section 5 then causes the resin loader 12 to hold the release film F on which liquid resin R has been supplied, convey the release film F to one of the compression-molding modules 3, and place the release film F onto the lower die LM. The control section 5, in other words, causes the resin-sealing target substrate Sa to be set on the upper die UM and the release film F to be set on the lower die LM. Then, as illustrated in FIG. 2, the control section 5 causes the mold clamp mechanism 35 to clamp the upper die UM and the lower die LM together to prepare a resin-sealed substrate Sb (resin molding step). After resin molding is completed, the control section 5 causes the substrate loader 41 to convey the resin-sealed substrate Sb from the compression-molding module 3 to the conveying module 4, and causes the robot arm 45 to receive the resin-sealed substrate Sb from the substrate loader 41 and store the resin-sealed substrate Sb into the second container section 44 (see FIG. 1). The control section 5 then determines whether to repeat the resin-molding operation. If the control section 5 repeats the operation, the control section 5 performs the above steps again. If the control section 5 does not repeat the operation, the control section 5 ends the procedure.

Second Embodiment

Figure 7:
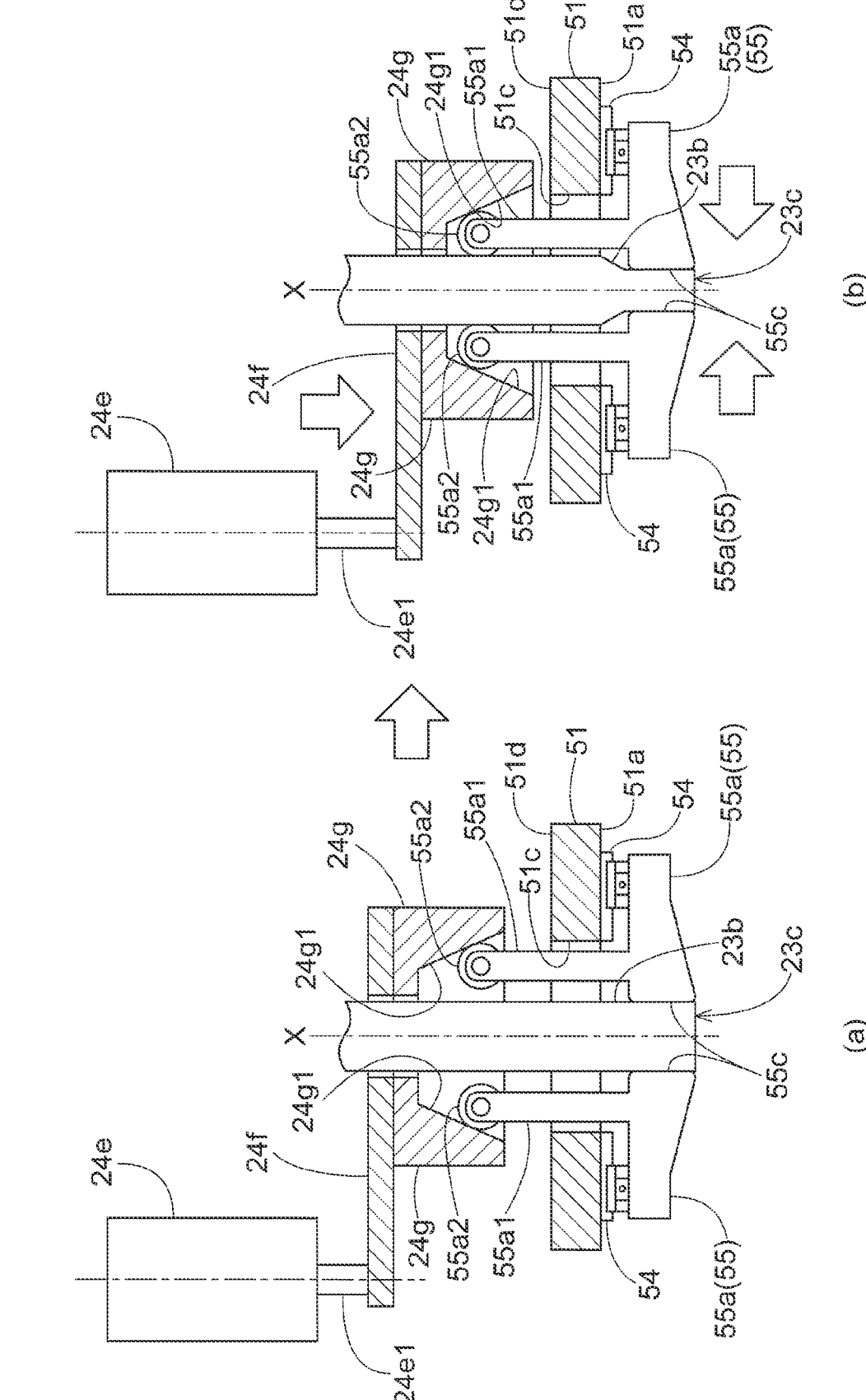
FIG. 7 shows diagrams schematically illustrating a clamp mechanism for a second embodiment.

The description below deals with a clamp mechanism 24 for the second embodiment with reference to FIG. 7. The clamp mechanism 24 for the present embodiment is configured to move the clamp members 55 radially with use of an electric motor 24e, a plate 24f, and wedges (which is an example of the "tapered member") 24g in place of the electric motor 24a, the pulley 24b, the timing belt 24d, and the ring-shaped cam 53. FIG. 7 omits the syringe 23a and the attachment member 26.

The clamp mechanism 24 for the present embodiment is configured such that the electric motor 24e is a linear actuator including a rod 24e1 and configured to extend and contract the rod 24e1 electromagnetically. The plate 24f is attached at a surface thereof to the rod 24e1 and movable upward and downward together with the extension and contraction of the rod 24e1. The clamp mechanism 24 includes four wedges 24g disposed on that surface of the plate 24f which is opposite to the above surface and circumferentially apart from one another by 90 degrees with an axis X as the center. The wedges 24g each have a tapered face 24g1 inward (that is, toward the axis X). The plate 24f and the wedges 24g may be produced as a single member, or as separate parts and screwed, bonded, or otherwise fixed to each other for integration with each other.

The ring-shaped fixing section 51 is opposite to the wedges 24g across the plate 24f as viewed along the axis X, and is fixed to an attachment member 26 (not illustrated in the drawings). The ring-shaped fixing section 51 has a lower face 51a toward the ejection outlet 23c of the nozzle 23b. Similarly to the first embodiment, the present embodiment includes four linear motion guides 54 on the lower face 51a in positional correspondence with the wedges 24g and clamp members 55 movable relative to the respective linear motion guides 54. The ring-shaped fixing section 51 has an upper face 51d facing the plate 24f and separated therefrom in an axial direction in which the axis X extends. Similarly to the first embodiment, the present embodiment includes compression coil springs 56 (not illustrated in the drawings) each extending between adjacent clamp members 55 in a bridging manner.

The clamp members 55 for the present embodiment each include a clamp portion 55a with an arm 55al extending through a hole 51c in the ring-shaped fixing section 51 parallel to the axis X to reach the tapered face 24g1 of the corresponding wedge 24g. The arms 55a1 are each provided with a roller (which is an example of the "contact section") 55a2 attached to the tip of the arm 55al, rotatable relative to the arm 55a1, and in contact with the tapered face 24g1 of the corresponding wedge 24g. The tapered faces 24g1 are each farther apart from the axis X toward the ring-shaped fixing section 51.

FIG. 7 illustrates in (a) an initial state, that is, the rod 24e1 of the electric motor 24e as contracted and the four clamp members 55 as moved farthest outward in the radial direction due to the action of the compression coil springs 56. In this instance, the respective inner ends 55c of the clamp portions 55a are either in contact with the outer surface of the nozzle 23b or proximate thereto with only a minutely small distance in-between, so that the ejection outlet 23c remains circular in shape and unchanged and that its opening area also remains as original.

Then, the clamp mechanism 24 causes the electric motor 24*e* to operate to extend the rod 24*e*1 as illustrated in (b) of FIG. 7, which moves the plate 24*f* and the wedges 24*g* downward. The wedges 24*g* moving downward changes the position at which each roller 55*a*2 is in contact with the corresponding tapered face 24*g*1, that is, moves each roller 55*a*2 across the corresponding tapered face 24*g*1 toward the axis X, which moves the four clamp members 55 radially inward. The respective inner ends 55*c* of the clamp portions 55*a* thereby squeeze the tip of the nozzle 23*b*. The clamp portions 55*a* press the outer surface of the nozzle 23*b* at four positions and depress the nozzle 23*b* inward (that is, toward the axis X) to deform the ejection outlet 23*c* into an X shape and reduce its opening area.

Then, the clamp mechanism 24 causes the electric motor 24*e* to operate to contract the rod 24*e*1, which moves the plate 24*f* and the wedges 24*g* upward and reduces the force by which the tapered faces 24*g*1 press the respective rollers 55*a*2 toward the axis X. The clamp members 55 are thus moved radially outward due to the action of the compression coil springs 56. This stops the clamp members 55 from applying a force to the tip of the nozzle 23*b*, with the result of the opening area of the ejection outlet 23*c* returning to the initial state.

Third Embodiment

Figure 8:
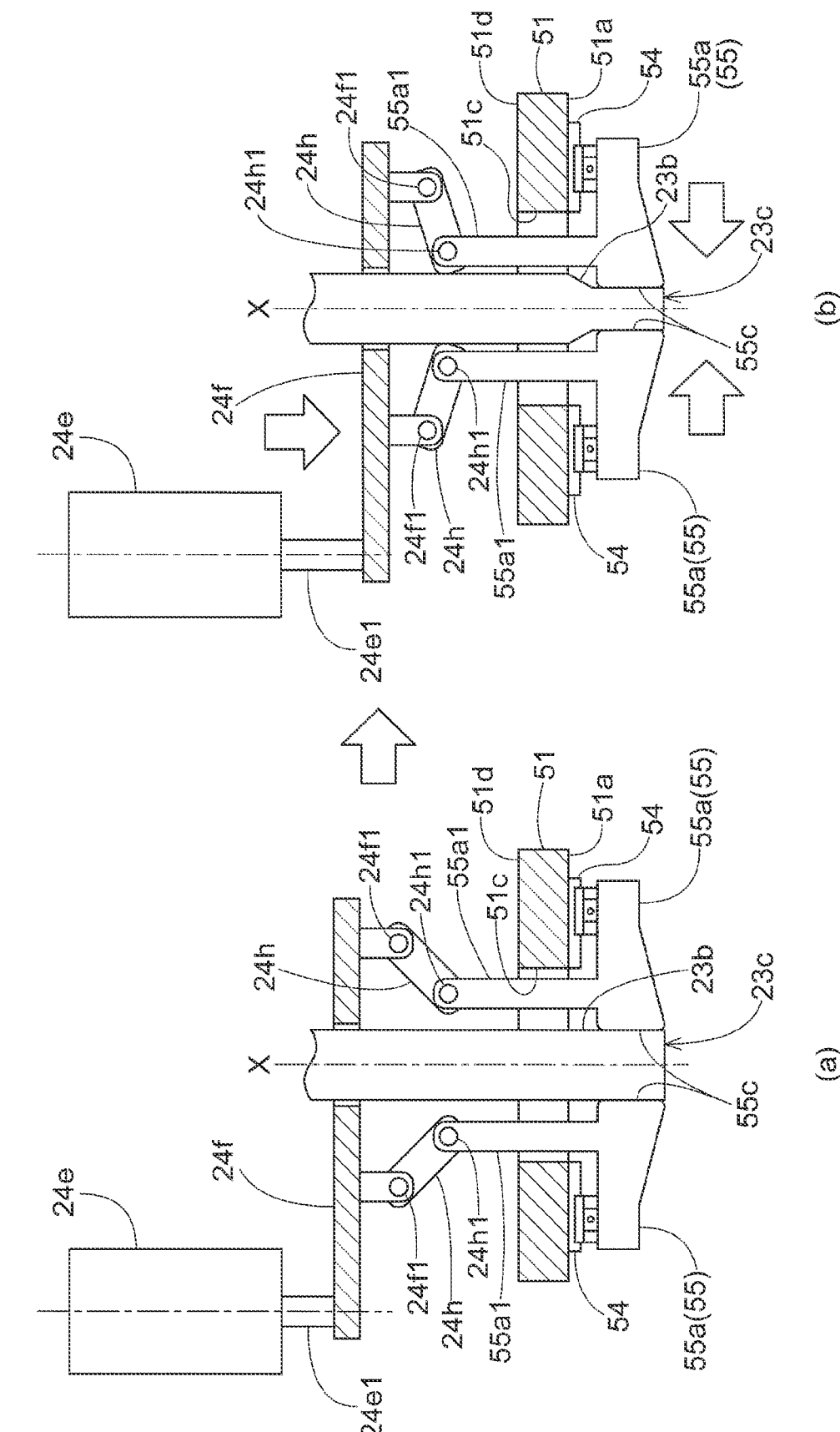
FIG. 8 shows diagrams schematically illustrating a clamp mechanism for a third embodiment.

The description below deals with a clamp mechanism 24 for the third embodiment with reference to FIG. 8. The clamp mechanism 24 for the present embodiment is config-ured to move the clamp members 55 radially with use of link members 24*h* in place of the wedges 24*g* and rollers 55*a*2 for the second embodiment. FIG. 8 omits the syringe 23*a* and the attachment member 26 similarly to FIG. 7.

The clamp mechanism 24 for the present embodiment is configured such that the electric motor 24*e* is a linear actuator including a rod 24*e*1 and configured to extend and contract the rod 24*e*1 electromagnetically. The plate 24*f* is attached at a surface thereof to the rod 24*e*1 and movable upward and downward together with the extension and contraction of the rod 24*e*1. The clamp mechanism 24 includes four link fixing ends 24*f*1 disposed on that surface of the plate 24*f* which is opposite to the above surface and circumferentially apart from one another by 90 degrees with an axis X as the center. The plate 24*f* and the link fixing ends 24*f*1 may be produced as a single member, or as separate parts and screwed, bonded, or otherwise fixed to each other for integration with each other.

The ring-shaped fixing section 51 is opposite to the link fixing ends 24*f*1 across the plate 24*f* as viewed along the axis X, and is fixed to an attachment member 26 (not illustrated in the drawings). The ring-shaped fixing section 51 has a lower face 51*a* toward the ejection outlet 23*c* of the nozzle 23*b*. Similarly to the first embodiment, the present embodi-ment includes four linear motion guides 54 on the lower face 51*a* in positional correspondence with the link fixing ends 24*f*1 and clamp members 55 movable relative to the respec-tive linear motion guides 54. The ring-shaped fixing section 51 has an upper face 51*d* facing the plate 24*f* and separated therefrom in an axial direction in which the axis X extends.

The clamp members 55 for the present embodiment each include a clamp portion 55*a* with an arm 55*al* extending through a hole 51*c* in the ring-shaped fixing section 51 parallel to the axis X similarly to the second embodiment. The arms 55*al* each have a leading end provided with a link member 24*h* linking the arm 55*al* to the corresponding link fixing end 24*f*1. Specifically, the link members 24*h* each have a first end attached to the corresponding link fixing end 24*f*1 on the plate 24*f* and a second end as a link free end 24*h*1 proximate to the axis X and the ring-shaped fixing section 51 as compared to the first end and attached to the arm 55*a*1 of the corresponding clamp portion 55*a*.

FIG. 8 illustrates in (a) an initial state, that is, the rod 24*e*1 of the electric motor 24*e* as contracted, the link members 24*h* as inclined by approximately 45 degrees relative to the axis X, and each of the four clamp members 55 as moved radially outward. In this instance, the respective inner ends 55*c* of the clamp portions 55*a* are either in contact with the outer surface of the nozzle 23*b* or proximate thereto with only a minutely small distance in-between, so that the ejection outlet 23*c* remains circular in shape and unchanged and that its opening area also remains as original.

Then, the clamp mechanism 24 causes the electric motor 24*e* to operate to extend the rod 24*e*1 as illustrated in (b) of FIG. 8, which moves the plate 24*f* and the link fixing ends 24*f*1 downward. The link fixing ends 24*f*1 moving down-ward does not move the link free ends 24*h*1 (which are proximate to the axis X as compared to the link fixing ends 24*f*1) in the up-down direction, and thus increases the inclination of the link members 24*h* relative to the axis X (to approximately 70 degrees). This moves the link free ends 24*h*1 toward the axis X, which moves the four clamp members 55 radially inward. The respective inner ends 55*c* of the clamp portions 55*a* thereby squeeze the tip of the nozzle 23*b*. The clamp portions 55*a* press the outer surface of the nozzle 23*b* at four positions and depress the nozzle 23*b* inward (that is, toward the axis X) to deform the ejection outlet 23*c* into an X shape and reduce its opening area.

Then, the clamp mechanism 24 causes the electric motor 24*e* to operate to contract the rod 24*e*1, which moves the plate 24*f* and the link fixing ends 24*f*1 upward and thus reduces the inclination of the link members 24*h* relative to the axis X. This moves the link free ends 24*h*1 away from the axis X. The clamp members 55 are thus moved radially outward. This stops the clamp members 55 from applying a force to the tip of the nozzle 23*b*, with the result of the opening area of the ejection outlet 23*c* returning to the initial state. The present embodiment, which uses the link members 24*h* to move the clamp members 55 toward and away from the axis X, does not need to include compression coil springs 56 unlike for the above embodiments.

ALTERNATIVE EMBODIMENTS

For ease of understanding, the description below uses the same terms and reference signs as in the description of the above embodiment for similar elements.

<1> The embodiments described above are each config-ured such that the ejection outlet 23*c* has four-fold rotational symmetry. This disclosure is, however, not limited to such a configuration. The ejection outlet 23*c* is shaped to have three or more fold rotational symmetry. The clamp members 55 are needed in a number equal to the fold number of the rotational symmetry.

<2> The embodiments described above each use liquid resin R as a resin material. This disclosure is, however, not limited to such a configuration, and may use resin powder. Resin powder is lower in fluidity than liquid resin R, which means that the resin supply device 2A will need to supply resin powder onto a release film F more uniformly than in the case of liquid resin R. The ejection outlet 23*c* should thus preferably be shaped to have three or more fold rotational symmetry. If the ejection outlet 23*c* has, for example, two-fold rotational symmetry as with an ellipse, the resin supply device 2A will be unable to easily supply resin powder uniformly as compared to the case of three or more fold rotational symmetry.

<3> The embodiments described above are each configured such that as illustrated in (c) of FIG. 6, the control section 5 controls the clamp mechanism 24 and the plunger to stop the ejection of liquid resin R from the ejection outlet 23c at the predetermined weight (that is, to prevent excess liquid resin R from dropping) with the opening area of the ejection outlet 23c of the nozzle 23b reduced but not to zero. This disclosure is, however, not limited to such a configuration, and may be configured, for instance, as follows: The clamp portions 55a each have the shape of a wedge or the like as viewed along the axis X and have an inner end 55c having a curved surface with a smaller radius. With this configuration, the clamp members 55 pressing the tip of the nozzle 23b from outside reduces the opening area of the ejection outlet 23c to zero.

<4> The embodiments described above are each configured such that as illustrated in (c) of FIG. 6, the control section 5 controls the clamp mechanism 24 and the plunger to stop the ejection of liquid resin R from the ejection outlet 23c at the predetermined weight (that is, to prevent excess liquid resin R from dropping) with the opening area of the ejection outlet 23c of the nozzle 23b reduced but not to zero. This disclosure is, however, not limited to such a configuration, and may, for instance, include a resin-receiving member such as a cup configured to be placed between the nozzle 23b and a release film F after the resin supply device 2A ends supplying liquid resin R onto the release film F with a predetermined weight. With this configuration, the resin-receiving member receives excess liquid resin R dropping from the ejection outlet 23c to prevent such liquid resin R from being supplied onto a release film F.

<5> The embodiments described above are each configured such that as illustrated in (c) of FIG. 6, the control section 5 controls the clamp mechanism 24 and the plunger to stop the ejection of liquid resin R from the ejection outlet 23c at the predetermined weight (that is, to prevent excess liquid resin R from dropping) with the opening area of the ejection outlet 23c of the nozzle 23b reduced but not to zero. This disclosure is, however, not limited to such a configuration, and may, for instance, include another clamp mechanism configured to pinch the nozzle 23b from opposite sides at a position further toward the syringe 23a than the clamp members 55 to reduce the cross-sectional area of the flow path of the nozzle 23b for liquid resin R to zero.

<6> The second and third embodiments described above each use a linear actuator as the electric motor 24e, but may alternatively use an electric motor 24a similar to that for the first embodiment. The second and third embodiments, in this case, each include a ball screw in place of the rod 24e1 together with a plate 24f with an internal thread so that the ball screw is screwed in the plate 24f. With this configuration, rotating the electric motor 24a also rotates the ball screw and moves the plate 24f upward and downward.

<7> The second embodiment described above is configured such that the respective tapered faces 24g1 of the wedges 24g are each farther apart from the axis X toward the ring-shaped fixing section 51. This disclosure is, however, not limited to such a configuration, and may be configured, for instance, such that the tapered faces 24g1 are each farther apart from the axis X as farther away from the ring-shaped fixing section 51. In this case, the wedges 24g moving upward moves the four clamp members 55 radially inward. The respective inner ends 55c of the clamp portions 55a thereby squeeze the tip of the nozzle 23b.

<8> The second embodiment and alternative embodiment 7 described above are each configured such that the respective tapered faces 24g1 of the wedges 24g are in contact with the respective rollers 55a2. This disclosure is, however, not limited to such a configuration, and may, for instance, omit the rollers 55a2 and be configured such that the arms 55al are in direct contact with and slidable across the respective tapered faces 24g1.

<9> The second embodiment and alternative embodiments 7 and 8 described above each include four wedges 24g. This disclosure is, however, not limited to such a configuration, and may replace the wedges 24g with, for example, a mortar-shaped member having a tapered face 24g1 entirely around the axis X.

<10> The third embodiment described above is configured such that the respective link free ends 24h1 of the link member 24h are proximate to the axis X as compared to the link fixing ends 24f1. This disclosure is, however, not limited to such a configuration, and may be configured, for instance, such that the link free ends 24h1 are away from the axis X as compared to the link fixing ends 24f1. In this case, the link fixing ends 24f1 moving upward moves the four clamp members 55 radially inward. The respective inner ends 55c of the clamp portions 55a thereby squeeze the tip of the nozzle 23b.

<11> The embodiments described above are each configured such that the resin supply device 2A includes a dispenser unit 21 oriented vertically (that is, in the Z direction). This disclosure is, however, not limited to such a configuration, and may be configured, for instance, such that the dispenser unit 21 is oriented horizontally (that is, in the Y direction).

<12> The embodiments described above each include a release-film cutting module 1 and a resin supply module 2 as two separate modules. This disclosure is, however, not limited to such a configuration, and may be configured, for instance, such that the resin supply module 2 includes a release-film cutting mechanism inside for a single-module configuration.

<13> The substrate S for this disclosure may have any shape such as a circle or a rectangle. Further, the substrate S may have any size, but should preferably be large (for example, with a diameter of 300 mm, or 300 mm by 300 mm) to have a large area for supply of liquid resin R and allow the dispenser unit 21 of the resin supply device 2A to move over a long distance.

<14> The embodiments described above are based on the die-down compression method. This disclosure may, however, be based on the die-up compression method, where an object to be molded such as a substrate is the supply target (that is, an object to which the resin supply device 2A supplies resin). This disclosure may also omit a release film F and be configured such that the mold die M is the supply target (that is, an object to which the resin supply device 2A supplies resin).

<15> The embodiments described above each use the clamp mechanism 24 in the resin supply device 2A of the resin molding apparatus D. This disclosure is, however, not limited to such a configuration, and may, for instance, use the clamp mechanism 24 for a so-called die-bonding operation, that is, to supply adhesive such as an electrically conductive paste onto a lead frame and bond a semiconductor chip to the lead frame. Using the clamp mechanism 24 for a die-bonding operation allows adhesive to be supplied in an X shape without the need to move the nozzle 23b relative to the lead frame. Further, supplying adhesive without the clamp mechanism 24 clamping the nozzle 23b allows the adhesive to be in a circular shape. The above configuration thereby allows adhesive to be supplied in different shapes.

Summary of Above Embodiment

The description below summarizes the resin supply device 2A, the resin molding apparatus D, and the method for producing a resin molded product (that is, a resin-sealed substrate Sb) each described above as an embodiment.

(1) A resin supply device 2A characteristically includes: a resin supply mechanism (syringe 23a) configured to contain and supply a resin material (liquid resin R); a nozzle 23b made of an elastic material and having an ejection outlet 23c for ejecting the resin material (liquid resin R) from the resin supply mechanism (syringe 23a); and a clamp mechanism 24 configured to press a tip of the nozzle 23b from outside to shape the ejection outlet 23c into three or more fold rotational symmetry about an axis X of the nozzle 23b and change an opening area of the ejection outlet 23c.

Producing resin-sealed substrates Sb accurately at a compression-molding module 3 requires the resin supply device 2A to supply (that is, eject) liquid resin R onto a release film F accurately with a predetermined weight. As mentioned above, however, changing the opening area of the ejection outlet 23c of a nozzle 23b has conventionally required replacing the nozzle 23b with another one. This has made it impossible to increase both the productivity in producing resin-sealed substrates Sb and the accuracy in ejecting liquid resin R. The resin supply device 2A for the present embodiment is, in contrast, capable of shaping the ejection outlet 23c of a nozzle 23b into three or more fold rotational symmetry about an axis X and changing the opening area of the ejection outlet 23c with use of the clamp mechanism 24. This makes it possible to increase both the productivity in producing resin-sealed substrates Sb and the accuracy in ejecting liquid resin R without the need to replace nozzles 23b. With this configuration, the resin supply device 2A facilitates maintenance and is capable of changing the amount of resin material to be ejected per unit time.

(2) The resin supply device 2A may be further configured such that the clamp mechanism 24 includes clamp members 55 arranged around the nozzle 23b in a number equal to a fold number of the rotational symmetry and configured to press the tip.

With the above configuration, the clamp mechanism 24 includes clamp members 55 arranged around the nozzle 23b in a number equal to the fold number of the rotational symmetry. This allows the clamp mechanism 24 to reliably press the nozzle 23b from outside to shape the ejection outlet 23c into three or more fold rotational symmetry and change the opening area to change the amount of liquid resin R to be ejected per unit time.

(3) The resin supply device 2A may be further configured such that the clamp mechanism 24 further includes: a ring-shaped fixing section 51 around the nozzle 23b; a ring-shaped cam 53 at least a portion of which is disposed laterally outward of the ring-shaped fixing section 51, the ring-shaped cam 53 having a cam face 53b inward for applying a force to the clamp members 55; a bearing member (bearing 52) disposed between the ring-shaped fixing section 51 and the ring-shaped cam 53 and holding the ring-shaped cam 53 in such a manner that the ring-shaped cam 53 is rotatable relative to the ring-shaped fixing section 51; and linear motion guides 54 disposed on a lower face 51a of the ring-shaped fixing section 51 and configured to guide the respective clamp members 55, and the clamp members 55 are movable along the respective linear motion guides 54 toward the nozzle 23b to press the tip of the nozzle 23b in response to the ring-shaped cam 53 rotating.

With the above configuration, simply rotating the ring-shaped cam 53 moves the clamp members 55 toward the nozzle 23b along the respective linear motion guides 54 to press the tip of the nozzle 23b.

(4) The resin supply device 2A may be further configured such that the clamp mechanism 24 further includes: a ring-shaped fixing section 51 around the nozzle 23b; a plate 24f facing an upper face 51d of the ring-shaped fixing section 51 in an axial direction in which the axis X extends and movable in the axial direction relative to the ring-shaped fixing section 51; tapered members (wedges 24g) disposed on the plate 24f between the ring-shaped fixing section 51 and the plate 24f and having respective inner tapered faces 24g1; and linear motion guides 54 disposed on a lower face 51a of the ring-shaped fixing section 51 and configured to guide the respective clamp members 55, and the clamp members 55 include respective contact sections (rollers 55a2) in contact with the respective tapered faces 24g1, and the clamp members 55 are movable along the respective linear motion guides 54 toward the nozzle 23b to press the tip of the nozzle 23b in response to the contact sections (rollers 55a2) moving across the respective tapered faces 24g1 as a result of the plate 24f moving relative to the ring-shaped fixing section 51. The ring-shaped fixing section 51 may have an upper face 51d facing the plate 24f and apart or separated therefrom in an axial direction in which the axis X extends.

With the above configuration, simply moving the wedges 24g relative to the ring-shaped fixing section 51 moves the clamp members 55 toward the nozzle 23b along the respective linear motion guides 54 to press the tip of the nozzle 23b.

(5) The resin supply device 2A may be further configured such that the clamp mechanism 24 further includes elastic members (compression coil springs 56) each between circumferentially adjacent ones of the clamp members 55.

The compression coil springs 56 expand to apply a force to the clamp members 55 to reliably move the clamp members 55 radially outward and away from the axis X of the cam face 53b. This allows the shape and opening area of the ejection outlet 23c to return to the initial state.

(6) The resin supply device 2A may be further configured such that the clamp mechanism 24 further includes: a ring-shaped fixing section 51 around the nozzle 23b; a plate 24f facing an upper face 51d of the ring-shaped fixing section 51 in an axial direction in which the axis X extends and movable in the axial direction relative to the ring-shaped fixing section 51; link members 24h disposed between the ring-shaped fixing section 51 and the plate 24f and each having a first end attached to the plate 24f and a second end attached to a corresponding one of the clamp members 55; and linear motion guides 54 disposed on a lower face 51a of the ring-shaped fixing section 51 and configured to guide the respective clamp members 55, and the clamp members 55 are movable along the respective linear motion guides 54 toward the nozzle 23b to press the tip of the nozzle 23b in response to the link members 24h rotating as a result of the plate 24f moving relative to the ring-shaped fixing section 51. The ring-shaped fixing section 51 may have an upper face 51d facing the plate 24f and apart or separated therefrom in an axial direction in which the axis X extends.

With the above configuration, simply rotating the link members 24h moves the clamp members 55 toward the nozzle 23*b* along the respective linear motion guides 54 to press the tip of the nozzle 23*b*.

(7) A resin molding apparatus D characteristically includes: a resin supply device 2A according to any one of (1) to (6) above; a mold die M including an upper die UM and a lower die LM facing each other; and a mold clamp mechanism 35 configured to clamp the mold die M with the resin material (liquid resin R) between the upper die UM and the lower die LM, the resin material (liquid resin R) having been supplied from the resin supply device 2A.

With the above configuration, the resin molding apparatus D includes a resin supply device 2A including a clamp mechanism 24 configured to shape the ejection outlet 23*c* into three or more fold rotational symmetry about the axis X and change the opening area of the ejection outlet 23*c*. This makes it possible to increase both the productivity in producing resin-sealed substrates Sb and the accuracy in ejecting liquid resin R without the need to replace nozzles 23*b*. With this configuration, the resin molding apparatus D facilitates maintenance and is capable of changing the amount of resin material to be ejected per unit time.

(8) A method for producing a resin molded product (resin-sealed substrate Sb) with use of a resin molding apparatus D according to (7) above characteristically includes: the resin supply device 2A supplying the resin material (liquid resin R) to a supply target (release film F) with the tip of the nozzle 23*b* pressed by the clamp mechanism 24; and producing a resin molded product with use of the resin material (liquid resin R) supplied by the resin supply device 2A.

The above method includes supplying liquid resin R onto a release film F with the tip of the nozzle 23*b* pressed by the clamp mechanism 24 of the resin supply device 2A. This makes it possible to increase both the productivity in producing resin-sealed substrates Sb and the accuracy in ejecting liquid resin R without the need to replace nozzles 23*b*. With this configuration, the method for producing a resin-sealed substrate Sb facilitates maintenance and is capable of changing the amount of resin material to be ejected per unit time.

INDUSTRIAL APPLICABILITY

This disclosure is applicable to a resin supply device, a resin molding apparatus, and a method for producing a resin molded product.

REFERENCE SIGNS LIST

2A Resin supply device
23*a* Syringe (resin supply mechanism)
23*b* Nozzle
23*c* Ejection outlet
24 Clamp mechanism
24*f* Plate
24*g* Wedge (tapered member)
24*g*1 Tapered face
24*h* Link member
35 Mold clamp mechanism
51 Ring-shaped fixing section
51*a* Lower face
51*b* Side face
51*d* Upper face
52 Bearing (bearing member)
53 Ring-shaped cam
53*b* Cam face
54 Linear motion guide 55 Clamp member
55*a*2 Roller (contact section)
56 Compression coil spring (elastic member)
D Resin molding apparatus
F Release film (supply target)
LM Lower die
M Mold die
R Liquid resin (resin material)
Sb Resin-sealed substrate (resin molded product)
UM Upper die
X Axis

The invention claimed is:

1. A resin supply device, comprising:
   a resin supply mechanism configured to contain and supply a resin material;
   a nozzle made of an elastic material and having an ejection outlet for ejecting the resin material from the resin supply mechanism; and
   a clamp mechanism configured to press a tip of the nozzle from outside to shape the ejection outlet into three or more fold rotational symmetry about an axis of the nozzle and change an opening area of the ejection outlet; wherein
   the clamp mechanism includes clamp members arranged around the nozzle in a number equal to a fold number of the rotational symmetry and configured to press the tip; and
   the clamp mechanism further includes:
   a ring-shaped fixing section around the nozzle;
   a plate facing an upper face of the ring-shaped fixing section in an axial direction in which the axis extends and movable in the axial direction relative to the ring-shaped fixing section;
   link members disposed between the ring-shaped fixing section and the plate and each having a first end attached to the plate and a second end attached to a corresponding one of the clamp members; and
   linear motion guides disposed on a lower face of the ring-shaped fixing section and configured to guide the respective clamp members, and
   the clamp members are movable along the respective linear motion guides toward the nozzle to press the tip of the nozzle in response to the link members rotating as a result of the plate moving relative to the ring-shaped fixing section.

2. A resin molding apparatus, comprising:
   a resin supply device according to claim 1;
   a mold die including an upper die and a lower die facing each other; and
   a mold clamp mechanism configured to clamp the mold die with the resin material between the upper die and the lower die, the resin material having been supplied from the resin supply device.

3. A method for producing a resin molded product with use of a resin molding apparatus according to claim 2, the method comprising:
   the resin supply device supplying the resin material to a supply target with the tip of the nozzle pressed by the clamp mechanism; and
   producing a resin molded product with use of the resin material supplied by the resin supply device.

4. A resin supply device, comprising:
   a resin supply mechanism configured to contain and supply a resin material;
   a nozzle made of an elastic material and having an ejection outlet for ejecting the resin material from the resin supply mechanism; and a clamp mechanism configured to press a tip of the nozzle from outside to shape the ejection outlet into three or more fold rotational symmetry about an axis of the nozzle and change an opening area of the ejection outlet; wherein the clamp mechanism includes clamp members arranged around the nozzle in a number equal to a fold number of the rotational symmetry and configured to press the tip; and the clamp mechanism further includes:

a ring-shaped fixing section around the nozzle;

a plate facing an upper face of the ring-shaped fixing section in an axial direction in which the axis extends and movable in the axial direction relative to the ring-shaped fixing section;

tapered members disposed on the plate between the ring-shaped fixing section and the plate and having respective inner tapered faces; and linear motion guides disposed on a lower face of the ring-shaped fixing section and configured to guide the respective clamp members, the clamp members include respective contact sections in contact with the respective tapered faces, and the clamp members are movable along the respective linear motion guides toward the nozzle to press the tip of the nozzle in response to the contact sections moving across the respective tapered faces as a result of the plate moving relative to the ring-shaped fixing section.

5. A resin molding apparatus, comprising:

a resin supply device according to claim 4;

a mold die including an upper die and a lower die facing each other; and a mold clamp mechanism configured to clamp the mold die with the resin material between the upper die and the lower die, the resin material having been supplied from the resin supply device.

6. A method for producing a resin molded product with use of a resin molding apparatus according to claim 5, the method comprising:

the resin supply device supplying the resin material to a supply target with the tip of the nozzle pressed by the clamp mechanism; and producing a resin molded product with use of the resin material supplied by the resin supply device.

7. A resin supply device, comprising:

a resin supply mechanism configured to contain and supply a resin material;

a nozzle made of an elastic material and having an ejection outlet for ejecting the resin material from the resin supply mechanism; and a clamp mechanism configured to press a tip of the nozzle from outside to shape the ejection outlet into three or more fold rotational symmetry about an axis of the nozzle and change an opening area of the ejection outlet; wherein the clamp mechanism includes clamp members arranged around the nozzle in a number equal to a fold number of the rotational symmetry and configured to press the tip; and the clamp mechanism further includes:

a ring-shaped fixing section around the nozzle;

a ring-shaped cam at least a portion of which is disposed laterally outward of the ring-shaped fixing section, the ring-shaped cam having a cam face inward for applying a force to the clamp members;

a bearing member disposed between the ring-shaped fixing section and the ring-shaped cam and holding the ring-shaped cam in such a manner that the ring-shaped cam is rotatable relative to the ring-shaped fixing section; and linear motion guides disposed on a lower face of the ring-shaped fixing section and configured to guide the respective clamp members, and the clamp members are movable along the respective linear motion guides toward the nozzle to press the tip of the nozzle in response to the ring-shaped cam rotating.

8. The resin supply device according to claim 7, wherein the clamp mechanism further includes elastic members each between circumferentially adjacent ones of the clamp members.

9. A resin molding apparatus, comprising:

a resin supply device according to claim 7;

a mold die including an upper die and a lower die facing each other; and a mold clamp mechanism configured to clamp the mold die with the resin material between the upper die and the lower die, the resin material having been supplied from the resin supply device.

10. A method for producing a resin molded product with use of a resin molding apparatus according to claim 9, the method comprising:

the resin supply device supplying the resin material to a supply target with the tip of the nozzle pressed by the clamp mechanism; and producing a resin molded product with use of the resin material supplied by the resin supply device.

\* \* \* \* \*